Dec. 10, 1957     H. P. PHILLIPS     2,815,996
PISTON RING ASSEMBLY
Filed Feb. 14, 1955
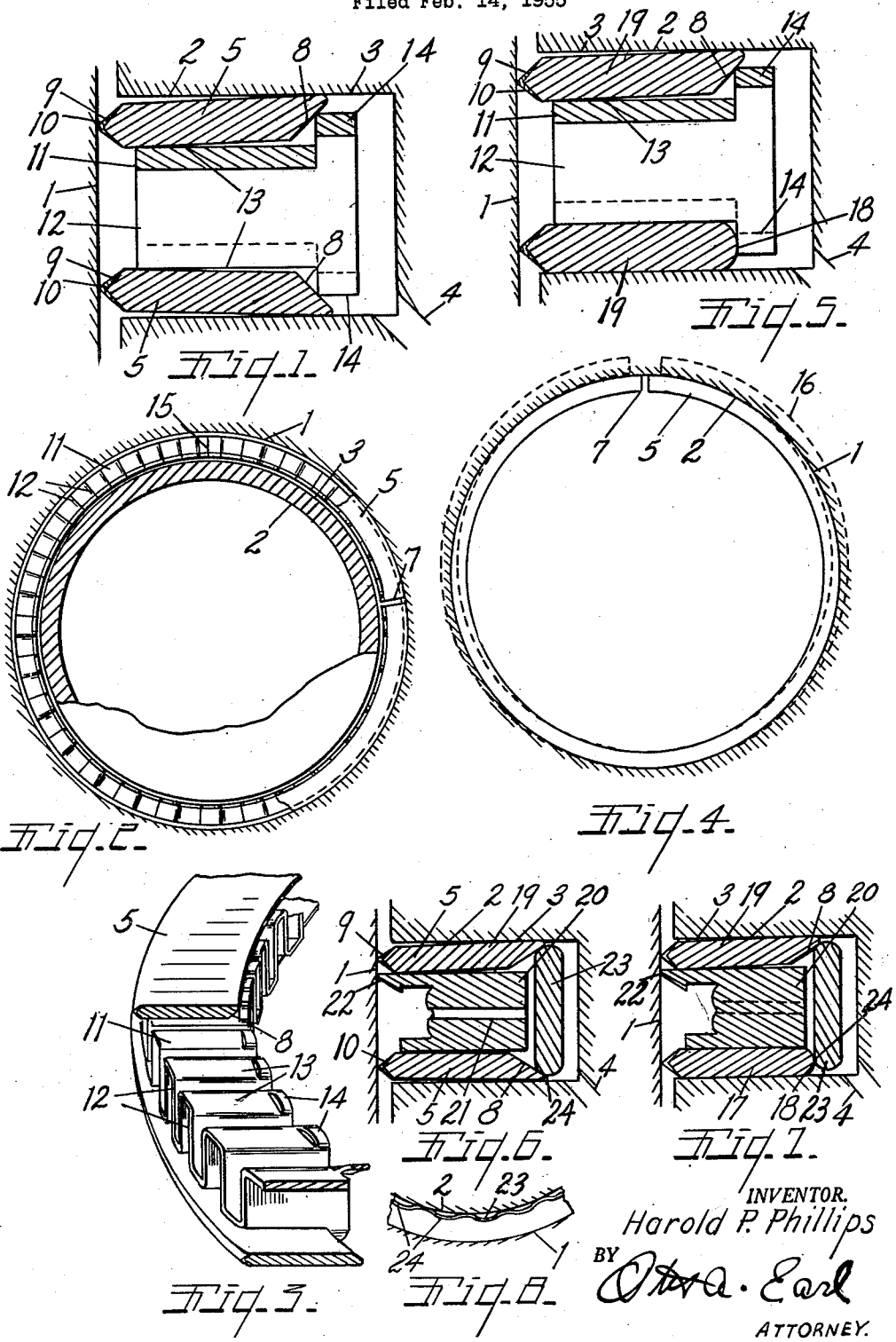
INVENTOR.
Harold P. Phillips
BY
ATTORNEY.

United States Patent Office 2,815,996
Patented Dec. 10, 1957

2,815,996

PISTON RING ASSEMBLY

Harold P. Phillips, Hastings, Mich., assignor to Hastings Manufacturing Company, Hastings, Mich.

Application February 14, 1955, Serial No. 487,901

6 Claims. (Cl. 309—45)

This invention relates to improvements in piston ring assemblies particularly adapted for use as oil rings in internal combustion engines.

The main objects of this invention are:

First, to provide a piston ring assembly which is adapted for installation in piston ring grooves of varying depths and one in which the cylinder wall engaging elements are supported in axially spaced relation for independent radial movement and with a minimum of frictional contact with the walls of the grooves and of the intermediate or spacer member disposed between the ring elements.

Second, to provide a piston ring assembly comprising cylinder wall engaging elements and a combined spacer and expander member provided with abutments coacting with the cylinder wall engaging elements to tilt or cant the elements away from the walls of the groove.

Third, to provide a piston ring assembly in which the expander element performs the double function of imparting radial thrust to the cylinder wall engaging element associated therewith and cant or tilt the same away from the adjacent wall of the groove, and at the same time providing a restricted sliding axial thrust supporting engagement therewith.

Objects relating to details and economies of the invention will definitely appear from the description to follow. The invention is defined in the claims.

A structure which embodies the features of the invention is clearly illustrated in the accompanying drawing, in which:

Fig. 1 is a fragmentary longitudinal section of a cylinder and associated piston with the ring assembly of my invention installed therein, the cylinder and piston being shown conventionally and without regard to relative dimensions. The parts are shown greatly enlarged and without regard to commercial clearances and tolerances.

Fig. 2 is a fragmentary cross sectional view through the piston and cylinder conventionally shown in Fig. 1 with the ring assembly therein and partially broken away.

Fig. 3 is an enlarged fragmentary perspective view of the ring assembly of the embodiment shown in Figs. 1 and 2.

Fig. 4 is a diagrammatic view illustrating the relation of one of the piston ring elements to the cylinder wall and the gaps of the element when uncompressed and when compressed within the cylinder wall.

Fig. 5 is a fragmentary view corresponding to that of Fig. 1 in which only one of the cylinder wall engaging elements is provided with a beveled inner edge.

Fig. 6 is a fragmentary view corresponding to that of Fig. 1 showing a further embodiment of my invention in which the spacer element and expander element are separate instead of being integral as in the embodiment of Figs. 1, 2, 3 and 5.

Fig. 7 is a fragmentary view showing a modification of the embodiment shown in Fig. 6.

Fig. 8 is a fragmentary edge view of the expander of Figs. 6 and 7.

In the accompanying drawing 1 represents a cylinder and 2 a piston having a piston ring groove 3 therein, the groove having drain openings indicated at 4. No attempt has been made to show these parts in their relative proportions or the clearances or tolerances between the parts as the main purpose is to show the relation of the ring assembly to the ring groove of the piston and its relation to the cylinder.

The ring assembly of my invention comprises the annular split cylinder wall engaging elements or members 5 which are preferably formed of ribbon steel coiled edgewise. These elements are split as indicated at 7 and are radially expansible and contractible. The elements 5 are provided with inwardly facing bevels 8 on their inner peripheries.

The cylinder wall engaging peripheries 9 are desirably beveled to provide a relatively narrow cylinder wall engaging peripheral surface which has chrome plating thereon indicated at 10. Ring elements having that feature are the subject matter of my pending application for Letters Patent filed May 17, 1952, Serial No. 288,369, Patent No. 2,712,971, issued July 12, 1955.

The combined spacer and expander member or element designated generally by the numeral 11 shown in Figs. 1, 2, 3 and 5 is that of my Patent No. 2,656,230 issued October 20, 1953. This combined spacer and expander element is formed of resilient ductile metal desirably of ribbon steel stock corrugated sidewise to provide a plurality of uniformly spaced corrugations 12, the bights 13 of which are in supporting relation to the cylinder wall engaging elements and are provided with axially projecting abutments 14 which engage the beveled edges 8 of the cylinder wall engaging elements and act to impart radial thrust thereto and also to cant or tilt them inwardly toward the spacer parts as is illustrated in the drawings.

The abutments engaging the beveled edges 8 urge the inner edges of the cylinder wall engaging elements 5 axially outward against the adjacent side walls of the groove. This results in a very limited frictional contacting engagement of the elements 5 with the walls of the groove and as they move radially with the combined spacer and expander member there is substantially no frictional movement between them. The corrugations of the combined spacer and expander member provide an annular series of annular springable elements so that when the assembly is installed in a piston groove with the ends of the combined expander and spacer in abutting relation as shown at 15 and under annular or circumferential compression the element serves a desirable function of spacer and expander, and that without regard to the depth of the groove. In other words, it is not necessary for this element to bottom on the bottom of the groove.

The forming of the cylinder wall engaging elements of ribbon steel coiled edgewise and conforming them so that they are somewhat out-of-round when uncompressed as indicated by dotted lines at 16, Fig. 4, the elements themselves have substantial resilience when installed, as illustrated in Fig. 4. The gap opening with the element uncompressed is desirably approximately one-eighth the diameter of the element. For example, a two-inch element has a one-fourth inch gap and a four-inch element a one-half inch gap when uncompressed. The cylinder will engaging elements are desirably formed of ribbon steel coiled edgewise and of stock of approximately .024 of an inch in thickness. However, this is sometimes varied for ring assemblies of varying diameters.

In the embodiment shown in Fig. 5 the bottom cylinder wall contacting element or rail 19 has a rounded inner edge or periphery 18 so that this ring element is not tilted or canted as is the case with the upper ring element 19 of this embodiment.

In the embodiment of Figs. 6 and 7 the ring elements 5 are the same as in the embodiment shown in Fig. 1 but the spacer member 20 is formed as a casting and has drain openings 21 therein and a narrow cylinder wall contacting peripheral edge 22. The expander 23 is of the flat sinously bent ribbon type and has abutments 24 engaging the beveled surfaces 8 of the ring elements. The spacer member 20 is formed of cast iron and is inherently resilient to a substantial degree. In the embodiment shown in Fig. 7 the bottom ring element 17 is provided with a rounded inner edge 18 as in the embodiment of Fig. 5.

The ring assembly of this invention is highly efficient and particularly desirable for use in worn cylinders which may have substantial taper or are out-of-round, or both. The embodiments shown in Figs. 1, 2, 3 and 5 are highly desirable in that the cylinder wall engaging elements are uniformly resiliently supported to permit yielding thereof at any point throughout the circumference thereof. The embodiments shown in Figs. 6 and 7 require that the expander be bottomed on the bottom of the piston ring groove and therefore the assembly is not adaptable to piston ring grooves of varying depth.

I have illustrated my invention in highly practical embodiments thereof. I have not attempted to illustrate or describe various adaptations which I contemplate as it is believed these disclosures will enable the adaptation of my invention as may be desired.

Having thus described my invention, what I claim as new and desire to secure by Letters Patent is:

1. A piston ring assembly comprising axially spaced annular thin split expansible initially substantially flat cylinder wall engaging elements formed of ductile ribbon metal coiled edgewise and having inwardly beveled inner edges, and an annular split resilient combined spacer and expander intermediate member formed of ductile ribbon metal corrugated sidewise providing an annular series of connected annularly springable elements and disposed radially edgewise between the cylinder wall engaging elements with corresponding bights in axial thrust supporting relation thereto, said intermediate member being under springable compression with its ends in abutting relation when the assembly is installed in the piston ring groove, the bight portions of the corrugations being in parallel planes and having axially projecting thrust abutments engaging the said inner beveled edges of the cylinder wall engaging elements and acting to impart radial thrust thereto and to dish or tilt them into axial thrust supported engagement with said bights of the intermediate member and away from the walls of the groove and axially urge their inner edges toward the walls of the groove.

2. A piston ring assembly comprising axially spaced annular thin split expansible initially substantially flat cylinder wall engaging elements formed of ductile ribbon metal coiled edgewise at least one of said members having an inwardly facing beveled inner edge, and an annular split resilient combined spacer and expander intermediate member formed of ductile ribbon metal corrugated sidewise providing an annular series of connected annularly springable elements and disposed radially edgewise between the cylinder wall engaging elements with corresponding bights in axial thrust supporting relation thereto, said intermediate member being under springable compression with its ends in abutting relation when the assembly is installed in the piston ring groove, the bight portions of the corrugations being in parallel planes and axially projecting thrust abutments engaging the said inner edges of the cylinder wall engaging elements and acting to impart radial thrust thereto, the engagement of the abutments with the beveled edge acting to dish or tilt the element toward the intermediate member and away from the wall of the groove and axially urge its inner edge toward the adjacent wall of the groove.

3. A piston ring assembly comprising axially spaced annular thin split expansible initially substantially flat cylinder wall engaging elements formed of ductile ribbon metal coiled edgewise and having beveled inner edges, and a combined spacer and expander member disposed between the cylinder wall engaging elements and having abutments with which the inner beveled edges of the ring elements are engaged and acting to impart radial thrust thereto and to dish or tilt the ring elements into axial thrust engagement with spacer element and axially urge their inner edges toward the walls of the groove in which the assembly is installed.

4. A piston ring assembly comprising axially spaced annular thin split expansible initially substantially flat cylinder wall engaging elements formed of ductile ribbon metal coiled edgewise and having inwardly facing beveled inner edges, and an expander member disposed in radial thrust engagement with the inner beveled edges of the wall engaging elements and acting to impart radial thrust thereto and to dish or tilt the ring elements toward each other and axially urge their inner edges toward the walls of the groove in which the assembly is installed.

5. A piston ring assembly comprising a thin split expansible initially substantially flat cylinder wall engaging member having a beveled inner edge, and an annular resilient member formed of springable ductile metal corrugated sidewise and providing an annular series of connected axially springable elements disposed with the corresponding bights thereof in axial supporting relation to the cylinder wall engaging element, said bights having axially projecting abutment portions engaging the beveled inner edge of the cylinder wall engaging member and imparting axial thrust to the inner edge thereof and acting to tilt the cylinder wall engaging member into axial thrust supported engagement with the expander member.

6. A piston ring assembly comprising axially spaced annular thin split expansible initially substantially flat cylinder wall engaging elements at least one of which has an inwardly facing beveled inner edge, and an expander element coacting with both of said cylinder wall engaging elements to impart radial thrust thereto and in radial thrust engagement, the beveled edge of said one cylinder wall engaging element acting to tilt it inwardly away from the adjacent wall of the groove in which the assembly is included and its inner edge supportedly engaging the wall of the groove.

References Cited in the file of this patent

UNITED STATES PATENTS

| | | |
|---|---|---|
| 1,421,802 | Marshall | July 4, 1922 |
| 2,376,148 | Johnston | May 15, 1945 |
| 2,656,230 | Phillips | Oct. 20, 1953 |
| 2,695,825 | Estey | Nov. 30, 1954 |